3,513,464
BROKEN WIRE DETECTOR FOR HAY BALERS
Donald Evan Yarbro, Box 27, E. Star Rte., and Weldon Ray Yarbro, 112 S. 3rd, both of Lovington, New Mex. 88260
Filed Dec. 1, 1966, Ser. No. 598,377
Int. Cl. G08b 21/00; A01f 15/02
U.S. Cl. 340—259                                14 Claims

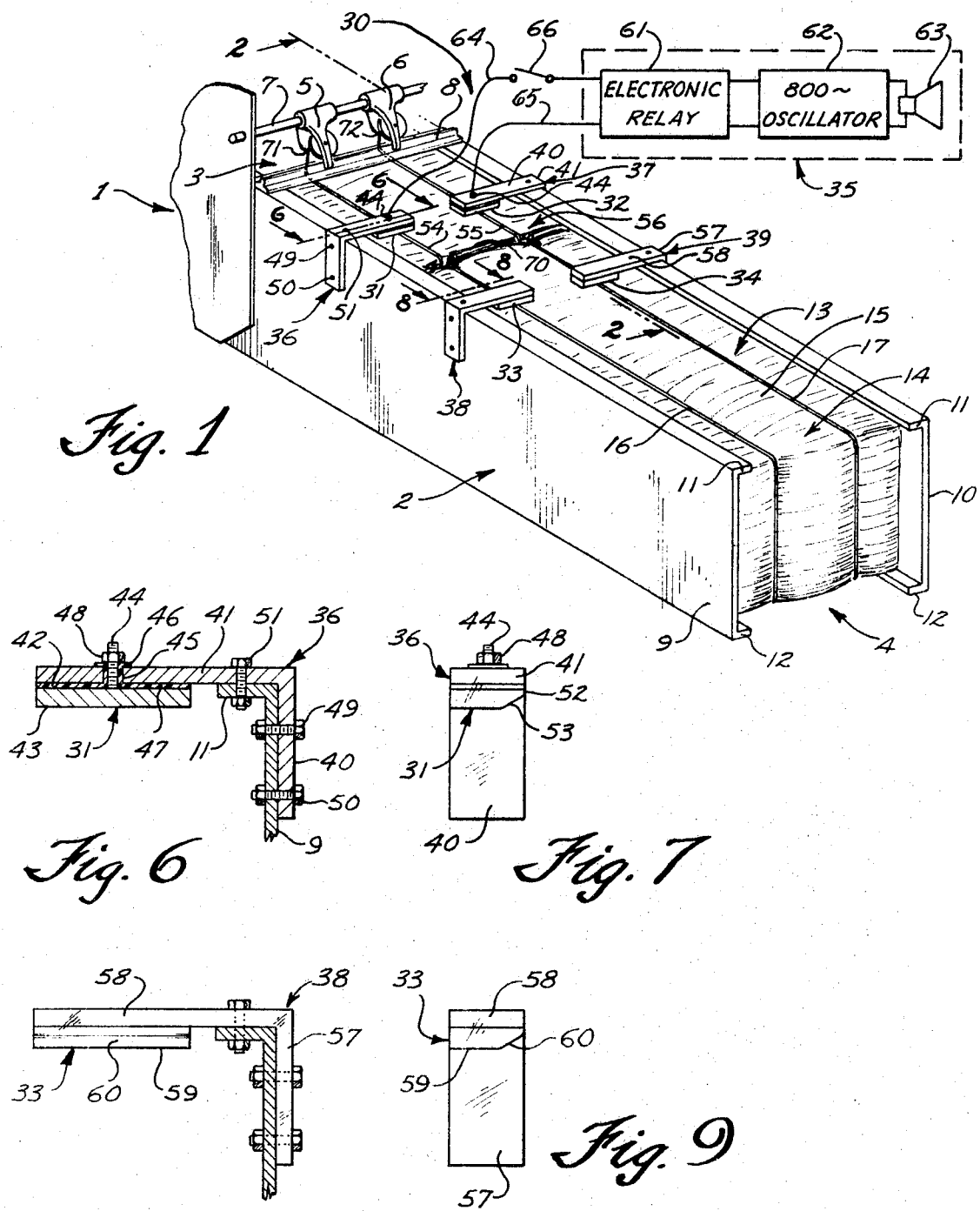

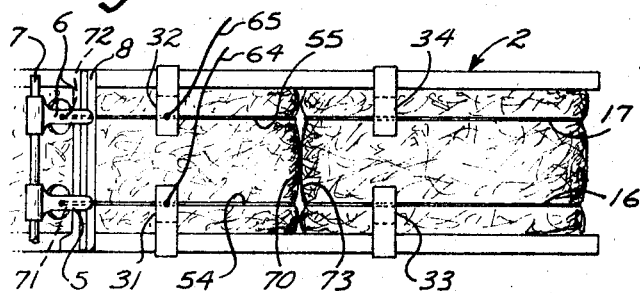
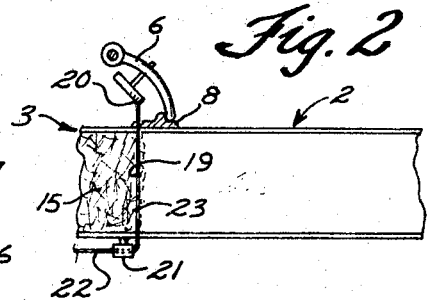
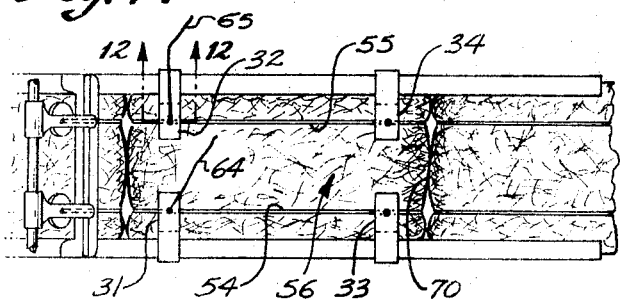
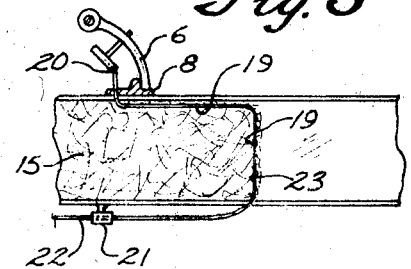
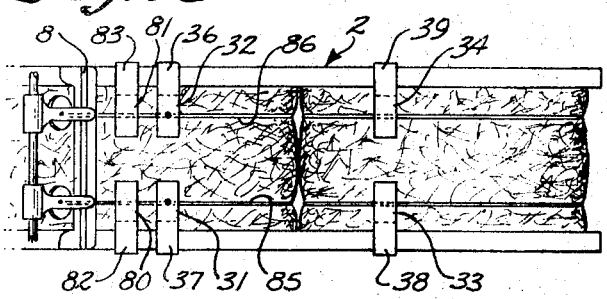
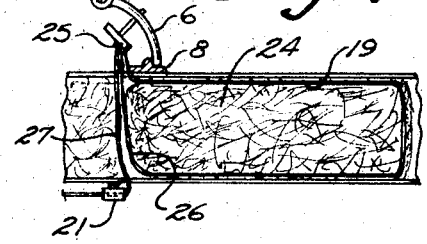
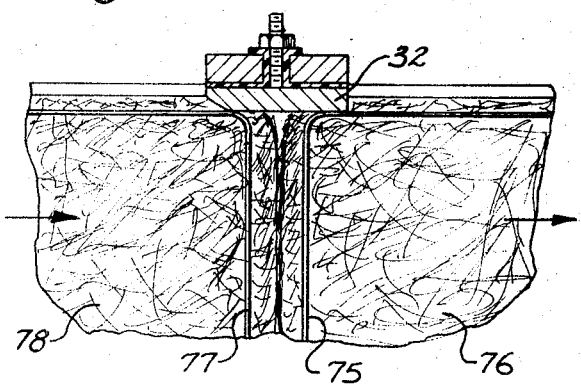
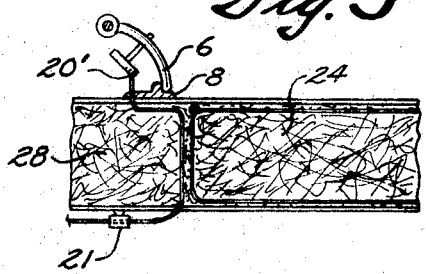
INVENTORS
DONALD EVAN YARBRO
WELDON RAY YARBRO
BY Arnold and Roylance
ATTORNEY'S

United States Patent Office 3,513,464
Patented May 19, 1970

ABSTRACT OF THE DISCLOSURE

The broken wire detector includes first and second electrical contacts adjacent the bale chamber which engage surfaces of the portions of the bale wire which extend around the baled material. The contacts are insulated from each other so a circuit between the contacts is complete only when bale wires are properly extended around the baled product. If either bale wire is defective, the circuit through the contacts is interrupted and a warning signal is initiated.

---

This invention relates generally to a broken wire detector for baling apparatus, and particularly to an attachment easily connectable to a pickup baler which signals the operator of the baler whenever a baling wire is not properly tide or is broken.

Within recent years, agricultural baling equipment has been improved to eliminate so much, as is possible manual labor in the baling operation. A mobile pickup baler now requires only one operator who drives the baler, or a tractor to which the baler is connected. It is merely necessary for the operator to guide the baler along the windrow, and the hay or straw is automatically picked up, baled, and the tide bales are dropped behind the baler without manual assistance.

Pickup balers are frequently so constructed that the operator cannot see the bales formed and dropped from the back of the baler. Hence, the operator does not know if the baler is producing sound bales unless he stops the baler periodically and walks to the back of the baler to look at the bales. However, since rapid baling is essential, the operator cannot take time to stop each 20 or 30 feet along the windrow to determine whether or not sound bales are produced by the baler. Instead, the operator drives the baler at a predetermined speed along the windrow, and if the baler is not working properly, he is frequently not aware of the malfunction until at least several broken bales are dropped on the field. Hence, there is a definite need for a reliable device to signal to the operator of a pickup baler that the baler is malfunctioning and not producing properly tide bales.

Although there have been some prior attempts to provide equipment which signals the operator when the baling equipment is malfunctioning, the known prior art equipment has been associated with the feed mechanism of the baling wire and signals only when the supply of baling wire is exhausted. Applicant's bale wire detector, on the other hand, is arranged to test for a broken bale wire and an improperly tied bale at the bale chamber of the baler immediately before a tied bale is dropped from the baler. Hence, applicant's device provides a positive indication of any malfunctioning of the baler which results in a bale without two properly tide wires.

The testing for a broken or otherwise defective wire is accomplished by electrical contacts which engage the baling wires of both a partially formed bale and a completed bale before the bale is dropped from the baler. The contacts are connected in series with the holding circuit of a signal device. So long as the holding circuit is complete through the contacts and baling wires, the signal device advantageously remains inactive. However, a broken or missing baling wire opens the holding circuit with corresponding operation of the signal device. The signal device is advantageously located at the operator's station on the tractor pulling the baler, and when the operator hears no alarm he knows that proper bales are formed. However, a broken, missing, or improperly tied bale wire causes the signal device to operate, to indicate the faulty condition to the operator. Thus, the operator can immediately correct the malfunction or faulty condition.

Among the advantages of applicant's invention is the extreme simplicity of the apparatus which requires only a relatively inexpensive signal system and an inexpensive and reliable contact arrangement mounted on the bale chamber of the baler. The contact arrangement is of such a nature that it can be attached to any model or style of straw or hay baler using metal bale wire without the need for any modification whatever of any mechanism of the baler. Thus, the relatively uncomplicated apparatus of this invention, although it has particular utility for detecting faulty baling wires of hay and straw balers of the pickup type also has utility for use with balers of various products where metal wires are used to tie the baled material.

Numerous other advantages of this invention will become apparent with reference to the drawings which form a part of this specification, and in which:

FIG. 1 is a pictorial view of the bale chamber of a baler, with portions of the baler removed, and showing a first embodiment of the broken wire detector of this invention;

FIGS. 2–5 are each reduced scale partial sectional views taken along lines 2—2 of FIG. 1, with portions of the baling apparatus eliminated and portions shown schematically, and showing the sequence of steps in the forming of a bale by the baler, with:

FIG. 2 showing a baling wire held by the holding-tying mechanism and extending vertically in front of the product;

FIG. 3 showing a partially formed bale;

FIG. 4 showing the baling wire looped around the product;

FIG. 5 showing a tied bale and a partially formed new bale;

FIG. 6 is a partial enlarged sectional view of an insulated contact taken along lines 6—6 of FIG. 1;

FIG. 7 is a left hand end view of the contact of FIG. 6;

FIG. 8 is a partial enlarged view in section of an uninsulated contact taken along lines 8—8 of FIG. 1;

FIG. 9 is a left hand end view of the contact of FIG. 8;

FIG. 10 is a partial view in plan of the baler of FIG. 1 with the bales shown in a position corresponding to that of FIG. 1;

FIG. 11 is a plan view corresponding to FIG. 10 showing the bales formed by the baler in a different position relative to the broken wire detector contacts;

FIG. 12 is an enlarged view in partial section taken along lines 12—12 of FIG. 11 but showing a contact bridging the gap between two bales as the end of a bale passes under the contact; and FIG. 13 is a plan view showing a second embodiment of the broken wire detector, the second embodiment including a third set of contacts to insure good grounding of the wires of a partially completed bale.

Referring now to the drawing in detail and particularly to FIG. 1, there is shown a portion of a hay and straw baler 1. Baler 1, as shown in the drawings, is a McCormick Number 56 Wire Baler, the details of which are shown and described in the Operator's Manual, entitled, McCormick Number 56 Baler, dated Mar. 15, 1961, of International Harvester Company. As shown in FIG. 1, baler 1 has a bale chamber 2 with an inlet end 3 and an outlet end 4. Mounted adjacent the inlet end 3 of the baler are two baling wire holding and tying mechanisms 5 and 6. Holding and tying mechanism 5 is identical with holding and tying mechanism 6 and the two mechanisms are mounted on a support shaft 7 supported by the baler and extending generally transversely of the bale chamber at a location above the inlet end of the bale chamber. Extending across the bale chamber, adjacent holding and tying mechanisms 5 and 6, is a guide bar 8.

The baling chamber is of the customary type having a pair of side walls 9 and 10, each with inwardly facing upper and lower flanges 11 and 12, respectively.

As shown at FIG. 1, bale chamber 2 is elongated and is generally rectangular in transverse section between side walls 9 and 10 and upper and lower flanges 11 and 12, and has a generally open top 13. A bale 14 formed by the baler is comprised of a product such as straw or hay which is compressed to generally rectangular parallelepiped form and bound with bale wires 16 and 17, bale wire 16 extending completely around product 15 longitudinally of bale chamber 2, and bale wire 17 being in parallel spaced relation with bale wire 16. Baler 1 produces a bale 14 which is 38 inches long, 19 inches wide and 15 inches high, as viewed at FIG. 1. Bale wires 16 and 17 are each parallel with and spaced the same distance from the inner edges of the flanges 11 and 12 of the respective side walls 9 and 10.

Although the baler per se forms no part of this invention and balers of this type are old and well known in the art, the operation of the baler will be briefly described to facilitate understanding of the operation of the broken wire detector of this invention.

FIGS. 2–5 show the sequence of operations in the forming of a bale by baler 1. As shown at FIG. 2, product 15 is at inlet end 3 of bale chamber 2. A bale wire 19 has its end 20 held by holding and tying mechanism 6, the wire 19 extending vertically through bale chamber 2 and passing through a guide 21 mounted on the baler slightly below bale chamber 2. Wire 19 has a portion 22 connected to the wire supply coil (not shown) from which wire 19 is fed.

In operation of the baler, product 15 is fed intermittently into inlet end 3 of bale chamber 2 by a plunger (not shown). During each stroke of the plunger a certain additional amount of the product is forced into the bale chamber. As the forward end 23 of the compressed product passes through the chamber, additional wire is pulled from the feed coil by the product and the wire is deformed so it extends around the top, front, and bottom of the product (FIG. 3) as the product is progressively pushed through the bale chamber. Observe with reference to FIG. 3, that wire 19 extends beneath guide bar 8 and that end 20 of the wire is still tightly held by the holding and tying mechanism 6.

When a sufficient amount of product 15 is forced into bale chamber 2 to form a bale 24, as determined by a metering device on the baler (not shown), a needle mechanism (not shown) of the baler engages wire 19 adjacent guide 21 and lifts the wire upwardly to a position where the wire is gripped by the holding and tying mechanism 6. As shown at FIG. 4, the operation of the needle provides a generally inverted U-shaped length of wire with a bent end 25 gripped by the holding and tying mechanism and portions 26 and 27 extending downwardly through the bale chamber behind the product which forms bale 24. Holding and tying mechanism 6 then twists end 20 and end 25 together to tie wire 19 in a closed loop around the product, and severs portion 27 of the wire from the twisted portion. The operation of holding and tying mechanism 6 is such that a new wire end 20' resulting from cutting or severing of the wire after twisting is held by the holding and tying mechanism 6 for the formation of the next bale 28, shown partially formed at FIG. 5.

Although the operation of the baler generally has been described with regard to a single wire 19 and the holding and tying mechanism 6, it is to be understood that a second wire is simultaneously extended around the product in parallel relation to wire 19 so that the bale wires are spaced apart and parallel as shown at FIG. 1 for bale wires 16 and 17 of bale 14.

As shown at FIG. 1, the broken wire detector 30 includes a plurality of electrically conductive contacts 31–34 and a signal device 35. Contacts 31–34 are mounted respectively on contact support members 36–39.

With reference to FIGS. 6 and 7, contact support member 36 is generally L-shaped and has a flat vertical leg 40 and a flat horizontal leg 41 fixed to and extending perpendicularly from leg 40.

Contact 31 is formed from a flat rectangular bar of metal with good electrically conducting characteristics, the bar having flat upper and lower surfaces 42 and 43, respectively. Projecting upwardly from surface 42 is a stud 44 fixed to contact 31, as by welding, stud 44 extending through a suitable opening in leg 41 of contact support member 36. Surrounding stud 44 is a sleeve of electrically insulating material 45, the sleeve having an outwardly extending flange portion 46 to electrically insulate stud 44 from contact support member 36. Leg 41 is electrically insulated from surface 42 of contact 31 by a sheet 47 of electrically insulating material disposed between top surface 42 of the contact and the bottom surface of leg 41. A nut 48 threaded onto stud 44 rigidly mounts contact 31 on contact support member 36.

As shown at FIGS. 1 and 6, contact support member 36 is fixed to side wall 9 of bale chamber 2 with bolt and nut assemblies 49 and 50 which extend through vertical leg 40 and the vertical portion of side wall 9, and bolt and nut assembly 51 which extends through horizontal leg 41 and upper flange 11 of side wall 9. The bolt and nut assemblies rigidly mount contact support member 36 on the bale chamber with horizontal arm 41 extending transversely across open top 13 of the bale chamber.

As shown at FIG. 7, the leading edge 52 (the edge which faces toward inlet end 3 of bale chamber 2) of contact 31 is beveled along its length to provide a beveled portion 53.

Contact support member 37 is identical to contact support member 36, and has a vertical leg 40 and horizontal leg 41. Contact support member 37 is mounted on side wall 10 of the bale chamber and is fixed to the side wall with bolt and nut assemblies in the same manner described for contact support member 36. Contact 32 is identical to contact 31 and is mounted on horizontal leg 41 of contact support member 37 in the same manner as described for contact 31 so that contact 32 is insulated from contact support member 37. With reference to FIG. 1, it will be noted that the horizontal legs 41 of each of contact support members 36 and 37 are aligned with each other transversely of bale chamber 2 and each of legs 41 extends across baling wires 54 and 55 of a partially formed bale 56. Contacts 31 and 32 are so mounted on legs 41 of contact support members 36 and 37, respectively, that wire 54 is engaged by contact 31 at essentially the transverse center of the contact and likewise bale wire 55 is engaged by contact 32 at the transverse center of the contact. With reference to FIG. 6, it will be noted that contact 31 is elongated in a direction transversely of bale chamber 2. FIG. 7 shows that contact 31 is relatively narrow in a direction longitudinally of the bale chamber, but is sufficiently wide to bridge the gap between the wires of successively formed bales. Contact 32 is similarly proportioned.

Contact support members 38 and 39 are each substantially identical to contact support member 36, and each of contact support members 38 and 39 is formed of metal and has a vertical leg 57 and a horizontal leg 58 integral with and projecting at right angles to the vertical leg. Contact 33 is formed from a bar of metal with good electrically conducting characteristics, contact 33 being fixed to the bottom surface of horizontal leg 58, as by welding, to electrically connect contact 33 to metal support member 38. Contact 33 has a flat bottom surface 59 and a leading edge including a beveled portion 60.

Contact support member 39 is identical to contact support member 38 and contact 34 is identical to contact 33 and is fixed to horizontal arm 58 of support member 39. Contact support members 38 and 39 are mounted respectively on side walls 9 and 10 of bale chamber 2 with horizontal legs 58 of the contact support members aligned with each other transversely of the bale chamber. Contact support members 38 and 39 are fixed to the bale chamber by bolt and nut assemblies in the same manner as described for contact support member 36. With reference to FIG. 1, it will be noted that contact support members 38 and 39 are each spaced from contact support members 36 and 37 longitudinally of bale chamber 2 in a direction toward outlet end 4 of the bale chamber. Since contact support members 38 and 39 are made of metal, it is apparent that contacts 33 and 34 are each grounded to and hence, electrically connected to the baler. The distance from contacts 33 and 34 to holding and tying mechanisms 5 and 6 is slightly less than the length of a bale formed by baler 1.

As shown at FIGS. 1 and 6, contact 31 projects vertically downwardly slightly into bale chamber 2 so that bottom surface 43 of the contact is below upper flange 11 of side wall 9. The respective bottom surfaces of contacts 32–34 are coplaner with bottom surface 43 of contact 31. As also shown at FIG. 1, contacts 31 and 33 are aligned with each other longitudinally of bale chamber 2 to engage the left-hand one of the wires of a bale passing through the bale chamber. Similarly, contact 32 is aligned with contact 34 longitudinally of the bale chamber so that contacts 32 and 34 each engage the wire at the right-hand side of a bale passing through the bale chamber.

Signal device 35 includes an electronic relay 61, connected to an 800 cycle oscillator 62 which drives an acoustical alarm in the form of a speaker 63. Relay 61 is connected to stud 44 of contact 31 by a lead 64 and to stud 44 of contact 32 by a lead 65. A normally closed test switch 66 is connected in lead 64 to test signal device 35.

The circuit arrangement of relay 60 is such that the relay remains inactive so long as leads 64 and 65 are electrically connected. When relay 61 is off, oscillator 62 is likewise inactive and speaker 63 is not driven. However, when lead 64 is disconnected from lead 65 the electronic relay is activated to correspondingly operate oscillator 62 to drive speaker 63. To test the signal device it is merely necessary to open switch 66.

OPERATION

As shown at FIGS. 1 and 10, the leading end 70 of partially formed bale 56 is at a location beyond contacts 31, 32 so that bale wires 54 and 55 are engaged respectively by the contacts 31 and 32. End 71 of bale wire 54, at this stage of forming of bale 56 is gripped by holding and tying mechanism 5, and end 72 of bale wire 55 is gripped by holding and tying mechanism 6. Since holding and tying mechanisms 5 and 6, as well as shaft 7, are formed from metal, and hence are electrically conductive, bale wire 54 is electrically connected to bale wire 55. Hence, an electric circuit is complete from lead 64 to lead 65 via contact 31, bale wire 54, tying mechanism 5, shaft 7, tying mechanism 8, bale wire 55, and contact 32. Since, as previously explained, signal device 35 is inactive whenever lead 64 is electrically connected to lead 65, no alarm is emitted by speaker 63. Although a completed bale 14 has its wires 16 and 17 engaged respectively by contacts 33 and 34, the wires 16 and 17 do not contact wires 54 and 55 because the bulging of product 15 at leading end 70 of bale 56 and trailing end 73 of bale 14, maintains the wires separated.

As previously described, contacts 33 and 34 are located a distance slightly less than one bale length from holding and tying mechanisms 5 and 6. Hence, contacts 33 and 34 engage bale wires 54 and 55 respectively slightly before each of the wires is tied and then released by holding and tying mechanisms 5 and 6. As shown in FIG. 11, the wires 54 and 55 of now completed bale 56 have been tied by the holding and tying mechanisms and the wires have been released by the mechanisms. However, since contacts 33 and 34 engage bale wires 54 and 55 respectively slightly before the wires are released by the holding and tying mechanisms, lead 64 remains electrically connected to lead 65 via contact 31, wire 54, contact 33 which is grounded to the baler frame by support member 38, contact 34 which is grounded to the baler frame by support member 39, wire 55, and contact 32. Hence, so long as the two baling wires extended around a partially formed bale are sound and unbroken, and so long as the wires are properly tied around the bale after release by the holding and tying mechanism, signal device 35 remains inactive. Therefore, so long as the operator of the baler, who is usually driving the tractor pulling the baler, hears no sound from speaker 63, he knows that the baling wires are intact and that the baler is operating properly. It is to be appreciated that any malfunction of the baler which results in an untied bale causes the signal device to operate, thereby warning the operator of the baler of the defective condition.

As shown at FIG. 12, contact 32 is only sufficiently wide in a direction longitudinally of baler chamber 2 that the contact bridges the gap between the bale wire 75 of a leading bale 76 and a wire 77 of a trailing bale 78. The reason for making the contact relatively narrow longitudinally of the bale chamber is to resist lifting of the contact away from the bale wire by the bulging product around which the wire extends. Contact 31 has the same width. Hence, as bales are formed and moved through bale chamber 2, the contacts 31 and 32 bridge the gap between the bale wires of consecutive bales to continuously electrically connect lead 64 to lead 65 so long as each of the bale wires of each bale is properly extended around the product and tied.

As shown at FIG. 12, beveled portion 53 of contact 32 has smoothed and rounded edges. The beveled portion 53 of contact 31, and beveled portion 60 of contacts 33 and 34 also have smoothed and rounded edges to avoid damage to the baling wires of bales moving under the contacts.

It will be observed with reference to FIGS. 1 and 10 that contacts 31 and 32 are in only slightly spaced relation to the tying mechanisms 5 and 6 in a direction longitudinally of bale chamber 2. Hence, if either of the baling wires is not properly fed to the holding and tying mechanisms with the result that one of the wires is missing when the product moves to a position under contacts 31 and 32, the operator of the baler is immediately warned of a faulty bale by operation of signal device 35. Since the warning is given early in the bale forming cycle, the operator of the baler can immediately inspect the baling mechanism and correct the fault.

On the other hand, if the baling wires are properly fed to the holding and tying mechanisms but are improperly twisted and tied, the residual springiness of the wire will cause a wire to snap upwardly immediately after it passes under one of contacts 31 and 32, with the result that the holding circuit of the relay is broken and signal device 35 is activated to apprise the operator of the fault. To test the signal device, the operator need only open switch 66. If no sound is emitted from speaker 63, the operator knows the signal device is not operating properly.

FIG. 13 shows a second embodiment of the broken wire detector of this invention. The embodiment of FIG. 13 has contacts 31–34 and support members 36–39 each mounted in the same manner and location as that described for the embodiment for FIG. 1. There is also a signal device 35 identical to that previously described and which is connected to the contacts 31 and 32 in the same manner. The embodiment of FIG. 13 further includes a third pair of contacts 80 and 81. These contacts are positioned between the first set of contacts 31 and 32 and guide bar 8. Contacts 80 and 81 and their contact support members 82 and 83 are identical respectively, to contacts 33 and 34 and the contact support members 38 and 39 on which they are mounted. Thus, contacts 80 and 81 function to ground bale wires 85 and 86 to the frame of the baler.

The embodiment of FIG. 13 has particular utility with balers having worn holding and tying mechanisms which do not continuously electrically connect bale wires 85 and 86 together as well as with newer baler mechanisms employing nylon bearings or other electrically non-conductive elements which would not electrically connect the wires together. Thus, contacts 80 and 81 form a positive ground to assure that bale wires 85 and 86 are electrically connected to each other when this function cannot be accomplished by the holding and tying mechanisms of the baler.

The operation of the embodiment of FIG. 13 is essentially the same as that of the embodiment previously described. However, baling wires 85 and 86 remain electrically connected to each other by electrodes 80 and 81 for a short length of time following release of the wires by the holding and tying mechanisms.

While two preferred embodiments of the broken wire detector of this invention have been shown and described in detail, it is to be understood that numerous changes and variations can be made without departing from the scope of this invention. For example, the signal device 35 may be modified so that a continuous signal is given to the operator of the baler so long as a circuit is complete through contacts 31 and 32, the signal then ceasing when the circuit to the relay is open to thus warn the operator of a defective baling operation. The signal, of course, need not be audible but could be visual, whereupon the signal device would include, perhaps a lamp bulb, or could produce both an audible and a visual signal. In addition, it is to be appreciated that the leads 64 and 65 could be connected in the ignition circuit of the tractor which pulls the baler, whereupon the ignition circuit of the tractor motor would be disconnected when the circuit from the leads through contacts 31 and 32 is open.

What is claimed is:

1. In combination with a baler of the type in which the product to be baled is progressively moved through an elongated bale chamber having side walls, an inlet and an outlet, and where at least two bale wires are extended around the product in a direction longitudinally of the bale chamber and in generally parallel relation to each other, the wires are tied by a tying mechanism of the baler to form a bale, the bale is discharged from the bale chamber along a path parallel to the wires, and in which the wires are electrically connected to each other via the baler apparatus until the wires are tied, a defective bale wire detector comprising
 a pair of electrically conductive contacts;
 mounting means mounting said electrically conductive contacts on said baler in electrically insulated relation to each other, said mounting means mounting
  one of said contacts adjacent the bale chamber to electrically contact one bale of wire of a partially formed bale, and
  the other of said contacts adjacent the bale chamber in generally transverse alignment with said one of said contacts, to electrically contact another bale wire of a partially formed bale;
 whereby said pair of contacts
  are electrically connected to each other by the bale wires of a partially formed bale via the baler apparatus whenever the bale wires are sound, and
  are in open circuit relation to each other whenever any of said bale wires are defective;
 means electrically connected to said pair of contacts and responsive to an open circuit therebetween to apprise the operator of the baler of a defective wire;
 said mounting means for said contacts comprising a first mounting member and a second mounting member, each of said mounting members including
  a vertical leg, and
  a horizontal leg;
 said vertical leg of said first mounting member being fixed to one of the side walls of the bale chamber with said horizontal leg extending at least partially across the chamber;
 said vertical leg of said second mounting member being fixed to the other of the side walls of the bale chamber with said horizontal leg of said second mounting member extending across the bale chamber and toward the horizontal leg of said first mounting member;
 said contacts being rigidly mounted respectively on said horizontal legs of said first and second mounting members.

2. A defective bale wire detector according to claim 1 which further includes
 additional contact means engageable with each bale wire at a location spaced from said pair of contacts in a direction toward the outlet of the bale chamber;
 said additional contact means being electrically connected to each other;
 whereby, said pair of contacts are electrically connected to each other by said contact means after the bale wires are separated from the baler apparatus.

3. A defective bale wire detector according to claim 2 wherein
 said additional contact means includes,
  a first contact engaging one of the bale wires, and
  a second contact engaging the other of the bale wires
 said first and second contact means being electrically connected to each other by grounding same to the frame of the baler.

4. A defective bale wire detector according to claim 2 wherein
 said additional contact means are spaced from the holding and tying mechanism of the baler a distance not greater than one bale length.

5. Baler apparatus comprising, in combination, a baler having a bale chamber through which material to be baled is moved along a predetermined path, and wherein at least one electrically conductive bale wire is extended around the material in a direction generally parallel with said predetermined path and is tied;
 said bale chamber including an opening via which an outer face of the portion of said bale wire extended around the material is exposed; and
 means for detecting a bale with a defective wire after the wire is extended around the material to be baled and is tied, said means comprising
  first electrically conductive contact means,
  means mounting said first contact means adjacent said opening for engagement with said exposed outer face of said wire,
  second electrically conductive contact means engaging said exposed outer face of said wire in spaced relation to said first contact means,
  means electrically insulating said contact means from each other,
  continuity sensing means connected between said first and second contact means and sensing electrical continuity of the portion of the baling wire between said contact means, and
  means responsive to said sensing means to apprise the operator of the baler about a change of electrical continuity of the baling wire between said contact means.

6. A baler according to claim 5 wherein said means responsive to said sensing means is
a signal device which provides an audible signal whenever there is an open circuit between said first and second contact means.

7. A baler according to claim 5 wherein
said first contact means is electrically insulated from said baler; and
said second contact means is electrically connected to said baler.

8. An attachment for a baler according to claim 5 wherein
the bale chamber of the baler is rectangular in transverse section and has an inlet and an outlet and an elongated rectangular bale is formed by the baler, the bale chamber being at least partially open to provide said opening to expose portions of the bale wire extended around the product;
said means mounting said first contact on said baler includes
a leg fixed to said bale chamber and rigidly mounting said first contact means at the opening of the bale chamber;
said first contact means extending at least partially across the bale chamber to engage said exposed outer face of said one bale wire during movement of the product through the bale chamber;
means mounting said second contact means on said baler and comprising
an arm fixed to said bale chamber and rigidly mounting said second contact means at the opening of the bale chamber at a location spaced from said first contact means in a direction away from the inlet of the bale chamber;
said second contact means extending at least partially across the bale chamber to engage said exposed outer face of said one bale wired during movement of the product through the bale chamber.

9. A baler according to claim 8 wherein
said first contact means and second contact means each have a beveled surface at a leading edge thereof to prevent damage to the bale wire during movement of the product through the bale chamber.

10. A baler according to claim 8 wherein
each of said contact means is relatively narrow longitudinally of the bale chamber to resist lifting of the contacts away from said wire by the product around which the wire extends.

11. Baler apparatus comprising, in combination,
a baler having a bale chamber through which the material to be baled is moved along a predetermined path, and wherein first and second electrically conductive bale wires are extended around the material in a direction generally parallel with said predetermined path during movement of the material through the chamber;
said bale chamber including an open portion via which a surface of said first bale wire extended around the material is exposed, and via which a surface of said second bale wire extended around the material is exposed; and
means for detecting a bale with defective wires by engagement with said exposed surfaces of said first and second bale wires after said wires are extended around the material but before discharge of the bale from the bale chamber, said means comprising
first contact means extending across said bale chamber and engaging said exposed surface of said first bale wire,
second contact means in insulated relation to said first contact means, extending across said bale chamber, and engaging said exposed surface of said second bale wire,
connecting means engaging said first and second bale wires and electrically connecting said bale wires together,
sensing means responsive to an open circuit in one of said first and second bale wires, and
means responsive to said sensing means to apprise the operator of the baler about the open circuit.

12. Baler apparatus according to claim 11 wherein
said means for detecting a bale with defective wires detects defective wires on a bale after the wires are tied and before the bale leaves the bale chamber.

13. Baler apparatus according to claim 11 wherein said connecting means includes
a pair of contacts spaced from said contact means in the direction of discharge of a bale from said bale chamber,
said contacts being electrically connected to each other and extending across said bale chamber and engaging, respectively, said exposed surfaces of said first and second bale wires.

14. Baler apparatus according to claim 11 wherein
said means to apprise the operation of the baler about the open circuit includes
an audible signal.

References Cited

UNITED STATES PATENTS

| | | | |
|---|---|---|---|
| 2,549,296 | 4/1951 | Dilts | 340—259 X |
| 2,624,791 | 1/1953 | Krow | 340—259 |

JOHN W. CALDWELL, Primary Examiner

PERRY PALAN, Assistant Examiner

U.S. Cl. X.R.

340—267; 100—99